(12) United States Patent
Ding et al.

(10) Patent No.: US 6,248,182 B1
(45) Date of Patent: Jun. 19, 2001

(54) MANNICH DERIVATIVES OF EPOXY-NOVOLAC RESINS AND METHODS OF USING THE SAME

(75) Inventors: Hong Ding, Naperville, IL (US); Shih-Ruey Thomas Chen, Pittsburgh; Yi Jin Warburton, Moon Township, both of PA (US)

(73) Assignee: Calgon Corporation, Naperville, IL (US)

( * ) Notice: Subject to any disclaimer, the term of this patent is extended or adjusted under 35 U.S.C. 154(b) by 0 days.

(21) Appl. No.: 09/220,285

(22) Filed: Dec. 23, 1998

(51) Int. Cl.[7] .................................................. C23C 22/00
(52) U.S. Cl. ........................ 148/251; 252/393; 427/401
(58) Field of Search ...................... 427/401; 148/251, 148/257; 252/392, 393; 528/97, 104, 153, 154, 155

(56) References Cited

U.S. PATENT DOCUMENTS

| | | | | |
|---|---|---|---|---|
| 3,931,109 | * | 1/1976 | Martin .............................. | 260/47 EP |
| 3,994,989 | * | 11/1976 | Kempter et al. .................... | 260/831 |
| 4,396,432 | * | 8/1983 | Sekmakas et al. .................. | 523/416 |
| 4,741,352 | * | 5/1988 | Gray ................................... | 137/15 |
| 5,694,852 | * | 12/1997 | Bressler et al. .................... | 101/401.1 |

* cited by examiner

Primary Examiner—Roy King
Assistant Examiner—Andrew L. Oltmans
(74) Attorney, Agent, or Firm—Margaret M. Brumm; Thomas M. Breininger

(57) ABSTRACT

Compositions and methods for treating substrates are disclosed. The compositions are generally described as epoxy-novolac resins containing a Mannich derivatized bisphenol side chain. The methods, which comprise contacting the surface to be treated with these compositions, improve the corrosion resistance and/or adhesion properties of the treated surface.

4 Claims, 2 Drawing Sheets

MANNICH DERIVATIVES OF EPOXY-NOVOLAC RESINS AND METHODS OF USING THE SAME

BACKGROUND OF THE INVENTION

1. Field of the Invention

The present invention relates to compositions and methods for metal substrate treatment. More particularly, the present invention relates to compositions comprising epoxy-novolac resins containing a side chain substituent, and methods for treatment of metal and polymeric substrates using these compositions. These methods provide improved corrosion resistance and/or paint adhesion properties to the substrate being treated.

2. Background Information

The present invention is directed to methods which are generally useful in the art of metal substrate treatment, particularly the treatment of phosphatized metal substrates, and more particularly the post-treatment of phosphatized metal substrates. Such treatment imparts improved corrosion resistance to the substrate, and improves the adhesion of final coating layers such as paints, inks, lacquers and plastics. The need for applying protective coatings to metal substrates for improved corrosion resistance and/or paint adhesion characteristics is well known in the art of metal finishing, as well as other metal arts. The usual technique for applying such protective coatings to metal substrates involves contacting a clean metal substrate with a solution containing phosphate and possibly other metal ions to form a corrosion resistant, nonreactive phosphate complex coating on the metal substrate. Because such coatings convert the metal substrate from a chemically active surface readily susceptible to oxidation to one having improved corrosion resistance and/or paint adhesion properties, they are known in the art as "conversion coatings."

The corrosion resistance and paint adhesion of conversion coatings can be further enhanced by treating the metal substrate with a post-treatment solution. Typical of such solutions are dilute aqueous acidic solutions containing a hexavalent chromium compound. Because of the toxic nature of hexavalent chromium compounds, however, expensive treatments must be used to remove chromates from effluent water to prevent the pollution of rivers, streams, drinking water sources, and the like. Therefore, although chromium post-treatment solutions and processes are known to be effective, recent development efforts have been directed to discovering alternatives to chromium-containing compounds for post-treatment of conversion coatings.

U.S. Pat. No. 4,376,000 discloses processes for post-treating a phosphate-type conversion coated metal surface comprising contacting the surface with polyvinylphenol or its derivatives. U.S. Pat. Nos. 4,433,015 and 4,517,028 disclose aqueous compositions comprising polyvinylphenol and polyalkenylphenol derivatives and acid salts thereof, respectively; processes for treating a metal surface comprising contacting said surface with these aqueous compositions are also disclosed. U.S. Pat. No. 4,457,790 claims an aqueous solution comprising a metal ion and a polyvinylphenol derivative or acid salt thereof. A process for treating a metal surface comprising contacting said surface with the aqueous solution is also disclosed.

U.S. Pat. No. 5,523,363 relates to a resin obtained by reacting an epoxy resin, an amino compound and a phenol compound, and an epoxidized novolac-substituted phenolic resin. The resin is useful as an aqueous coating, particularly for cationic electrocoatings. There is no teaching of polymerizing the components, of using Mannich derivatives, or modifying an epoxy-novolac resin by adding a Mannich-derivatized bisphenol thereto, or of using the resin to treat metal or polymeric surfaces.

U.S. Pat. Nos. 5,039,310 and 4,883,826 disclose phenol-containing Mannich bases useful in lubricants, surfactants and dispersants. U.S. Pat. No. 5,039,310 discloses the reaction product of a Mannich-derivatized alkali metal salt of a phenol or $C_1$–$C_{16}$ alkylphenol and a $C_2$–$C_3$ alkylene epoxide. U.S. Pat. No. 4,883,826 discloses Mannich polyols prepared from the reaction between a phenolic compound, formaldehyde and a mixture of diethanolamine and at least one other alkanol amine. Again, neither patent teaches the addition to an epoxy-novolac resin of a Mannich derivative of a bisphenol to form a resin useful in the treatment of metals or polymeric substrates.

U.S. Pat. No. 5,298,289 discloses processes for treating certain plastic or painted surfaces with liquid surface treatment comprising water and a water soluble or dispersible polymer which contains substituted aminomethyl groups on some of the novolac phenyl rings in the backbone of the polymer. Other polymer compounds useful in metal treatment are disclosed in U.S. Pat. Nos. 5,116,912, 5,039,770 and 5,266,410 and EP 0 319 016. One significant difference between these compounds and those of the present invention is that the Mannich derivative is on the backbone of the phenol ring, rather than being attached as a side chain on the epoxy portion of the resin.

U.S. Pat. No. 5,324,347 relates to a composition comprising a liquid solvent or dispersant or surface coating composition and a 2,6-bis(substituted aminomethyl)phenol. There is no teaching that the phenol be polymerized with or otherwise reacted with an epoxy-novolac resin.

U.S. Pat. Nos. 5,389,405, 5,412,011 and 5,451,431 disclose aqueous solutions for coating a metal surface comprising a polymer, a silicate and an organofunctional silane. Methods of coating a metal surface comprising contacting said surface with the aqueous solutions are also disclosed.

U.S. Pat. No. 4,917,729 discloses metal chelating compounds that are Mannich derivatized bisphenol compounds having two Mannich groups, one attached to each ring of the bisphenol A. The compositions are stated as being useful for corrosion inhibition and adhesion promoting on a metal substrate. The patent does not appear to disclose addition of the Mannich derivatized bisphenol A to an epoxy-novolac resin.

U.S. Pat. Nos. 4,795,505 and 4,792,335 relate to compounds having only a single phenol ring and a single Mannich substituent and methods for inhibiting corrosion of metal substrates using these compounds.

WO 93/09265 discloses a treatment for the formation of a corrosion resistant film on metal surfaces. This treatment includes use of a phosphate surface-treatment bath containing a cationic organic polymeric compound having at least one cationic nitrogen atom. Disclosed as one of the polymeric compounds is the adduct of $HN(CH_3)_2$ with a bisphenol A epoxy resin.

WO 95/28449 discloses a polymer composition and method for using the composition in the treatment of metal surfaces. The polymer is a Mannich derivative of a novolac resin. The disclosure does not appear to teach an epoxy form of the novolac resin, or addition of a derivatized bisphenol resin to an epoxy-novolac resin.

European Patent Application 639,627 discloses aqueous solutions for pre-treating a metal surface, particularly aluminum, consisting essentially of an anionic polyacrylamide copolymer. A method of coating a metal surface which comprises contacting said surface with any of the aqueous solutions is also disclosed. Uses of other acrylate-containing compositions in treating aluminum are disclosed in U.S. Pat. Nos. 4,191,596 and 5,122,202.

Mannich condensates of a substituted phenol and an alkylamine containing internal alkoxy groups are disclosed in European Patent Application 469,203.

There remains a very real and substantial need for chrome-free methods for treating various metal substrates, particularly phosphatized metal surfaces. The present invention addresses this need.

SUMMARY OF THE INVENTION

The present invention is directed to a composition comprising one or more side chain modified epoxy-novolac resins in a suitable solvent. More specifically, the composition comprises the product of the reaction between an epoxy-novolac resin and a bisphenol resin, where the bisphenol has undergone Mannich derivatization either before or after reaction with the epoxy-novolac resin. The result is a product having a novolac backbone having Mannich derivatized bisphenol groups attached as side chains. The present invention is further directed to a method for treating various surfaces comprising contacting said surfaces with an effective amount of this composition. These methods are particularly applicable to the post-treatment of a phosphate-type conversion coated metal surface, although other applications are equally within the scope of the invention.

It is therefore an object of the invention to provide a method for treating a metal surface using a non-chromate formulation.

It is a further object of the invention to provide such a method using the reaction product of an epoxy-novolac resin and a Mannich-derivatized bisphenol resin.

Yet another object of the invention is to provide such a method that improves the corrosion resistance and/or paint adhesion characteristics of the metal surface being treated.

A further object of this invention is to provide a method for treating polymeric substrates using non-chromate formulations.

Another object of the present invention is to provide side chain modified epoxy-novolac resin formulations for surface treatment.

These and other objects of the invention will be apparent to those skilled in the art based on the following description and appended claims.

DETAILED DESCRIPTION OF THE INVENTION

The present invention is directed to a composition comprising: a polymer, or an acid salt thereof, having at least one repeat unit of the formula (1):

(1)

wherein each R is independently selected from wherein $R^1$ through $R^4$ are independently selected from H, $C_qH_{2q+1}$ and $C_qH_{2q}$—OH; $R^5$ is selected from H, $C_qH_{2q+1}$, $C_qH_{2q}$—OH and $C_qH_{2q}$—COOH; and q is between about 1 and 18; m and m' are each independantly 0, 1, or 2 and m and m' together are between about 1.0 and 4.0; X is H or $CH_3$; and Z is selected from straight chain or branched chain divalent aliphatic radicals having between about 1 and 3 carbon atoms, optionally and less preferred Z is also selected from $SO_2$, SO or O. Optimally, the polymer is contained in a suitable solvent or solvent mixture.

Preferably, the composition comprises between about 0.01 to about 60% active, based on total composition weight, of component a), more preferably between about 0.01 to about 5% active, based on total composition weight, and most preferably 0.05 to about 1.0% active, based on total composition weight.

Figure 1:
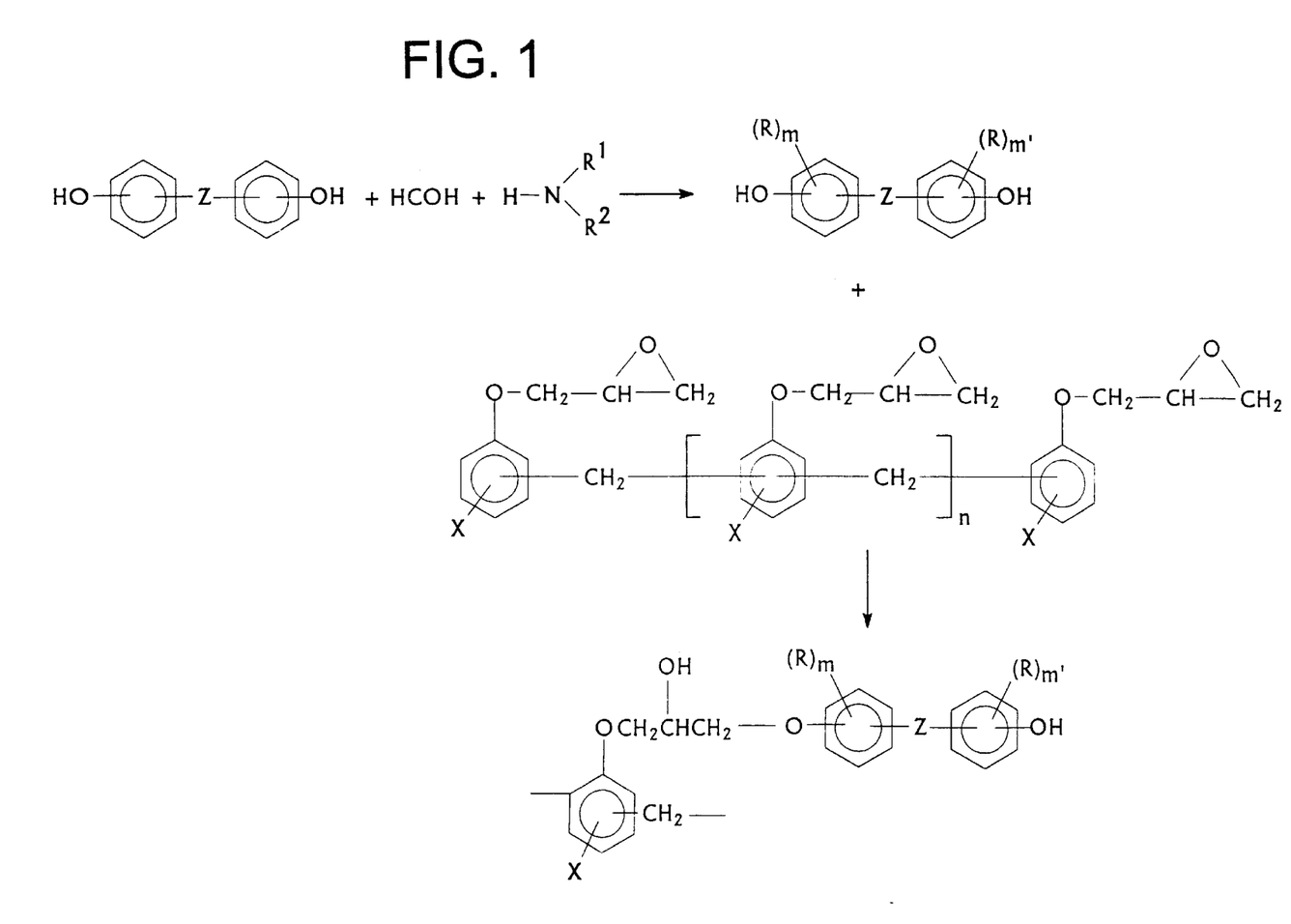
FIG. 1 shows a schematic diagram of the preferred method for preparing a preferred compound of the present invention in which bisphenol is subjected to a Mannich reaction and then further reacted with an epoxy-novolac resin.
Figure 2:
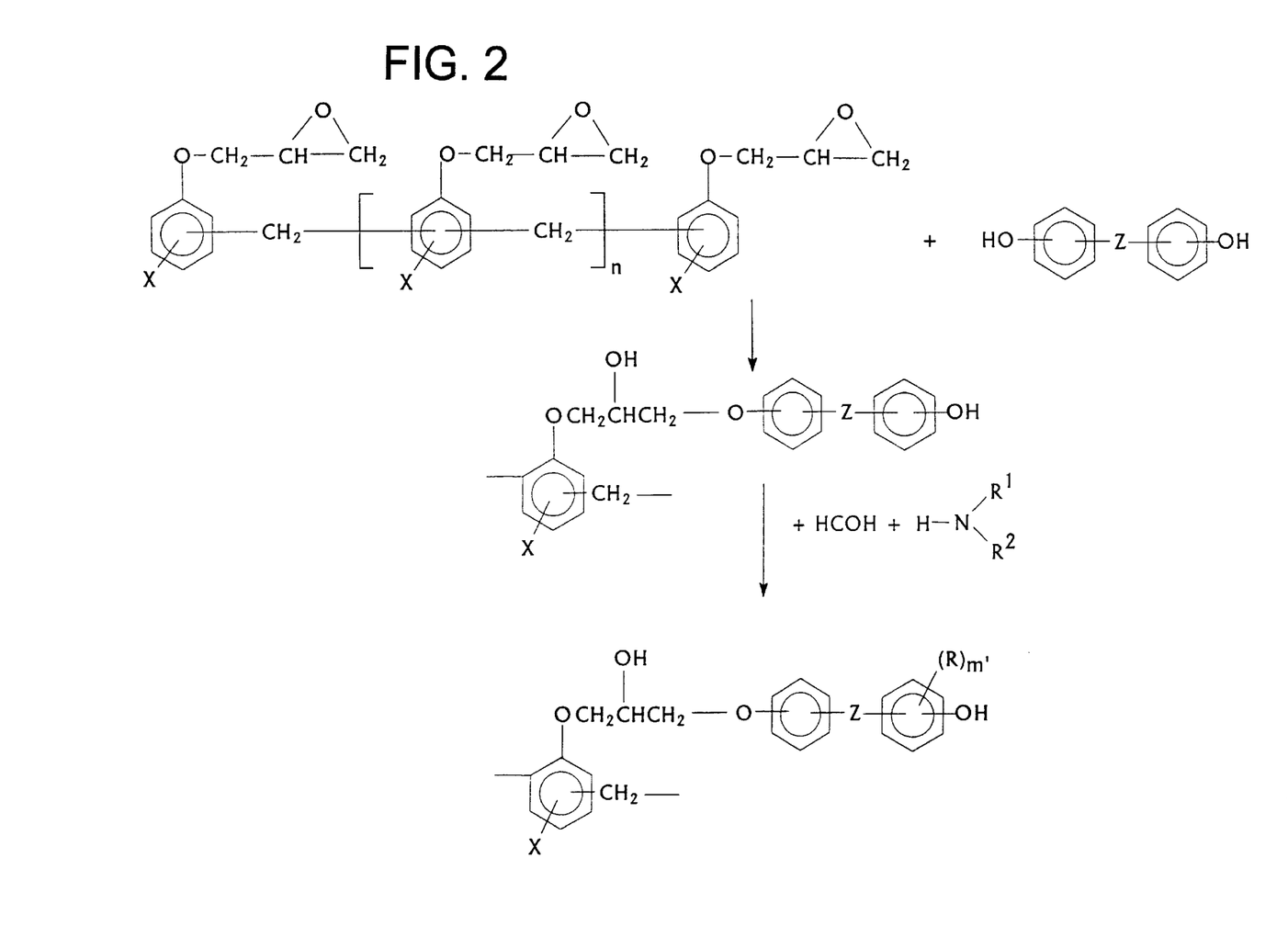
FIG. 2 shows a schematic diagram of an alternative method for preparing the compounds of the present invention, in which an epoxy-novolac resin is reacted with bisphenol, and the bisphenol portion of the molecule then undergoes Mannich derivatization. As can be seen, (R)m has been removed from the resulting product since, in this process, m is likely to be zero.

One skilled in the art will appreciate that the resin comprised of repeat units of formula (1) is the product of the reaction between an epoxy-novolac resin and a Mannich-derivatized bisphenol (as shown in FIG. 1), or a reaction product of an epoxy-novolac resin and a bisphenol which is subsequently Mannich-derivatized (as shown in FIG. 2). The polymer is therefore comprised of a novolac polymer backbone with side chain modifications. As used herein, the term "side chain modified epoxy-novolac resin" refers to such a compound. This compound can be nonionic, but preferably is cationic. The water solubility of the polymer can be altered by increasing or decreasing the Mannich derivatization on the bisphenol portion of the polymer by increasing or decreasing the value of m plus m', using protonized "R" groups, and/or increasing or decreasing the molecular weight of the polymer. Also, the more Mannich-derivatized bisphenol groups on the compound, the greater the water solubility. The preferred structure is therefore one having adequate water solubility.

The resulting product is a Mannich derivative of an epoxy-novolac resin that has at least one repeat unit of formula (1). This polymer, formula (1-A), is represented below:

(1-A)

wherein n is the same as in the original epoxy-novolac resin (A of formula 2). However, n is preferably between 1 and 50.

The backbone of the product is the epoxy-novolac resin, referred to herein as "A", and is generally represented by formula (2):

(2)

wherein X is as described above, and n is the number of repeating epoxy-novolac units in the polymer.

The substituent of the product, referred to herein as "B", is generally represented by formula (3):

(3)

wherein R, Z, and m and m' are as described above.

"A" is an epoxy-novolac resin. This resin is the reaction product of a novolac resin and an epoxy. More specifically, the epoxy is an epichlorohydrin epoxy. "Novolac", as will be understood by those skilled in the art, refers to a thermoplastic phenol-formaldehyde-type resin, or a cresol-formaldehyde-type resin, generally prepared with acid or neutral catalysts and excess phenol or cresol, respectively. The novolac portion of formula 2 is shown as having either a hydrogen or methyl substituent attached thereto, generically referred to as "X"; when the substituent is hydrogen, a phenol type resin is represented and when the substituent is methyl, a cresol type resin is represented. Epoxy-novolac resins are commercially available from Shell Chemicals, (Houston, Tex.) in its EPON® line. Particularly preferred are EPON® 155, with an epoxide equivalent weight of about 174–180, n=1.6 and X=H, and EPON® 160, with a weight per epoxide of about 168–178, n=0.5 and X=H. Both EPON® 155 and EPON® 160 are phenolic epoxy-novolac resins. EPON® 164, a cresol-type novolac resin as generally depicted in formula 2 above with n equalling 3 on average, and X=methyl, is also suitable for use in the present invention. Other suitable commercially available resins can also be used. In addition, such resins can be prepared by the user according to polymerization methods well known in the art.

"B" is the Mannich-derivatization of a known class of compounds broadly referred to as bisphenols. The bisphenols which can be used in accordance with this invention are generally represented by formula (4):

(4)

wherein Z is selected from a straight chain or branched chain divalent aliphatic radical of from 1 to 3 carbon atoms, $SO_2$, SO and O. The preferred bisphenol is bisphenol A (BPA) in which Z is 2,2-propylidene and the two OH groups are in the para position relative to the point at which Z is attached.

It will be appreciated that the polymer generally depicted above in formula (1) represents a repeating unit that characterizes the polymer compounds of the present invention; at least one such repeating unit is present in the compounds. The end group of the polymers of the present invention, not depicted, is typically determined by the starting epoxy-resin. The overall product structure, however, could be complicated; it could be linear, branched, cross-linked, or some combination of these configurations, as will be appreciated by those skilled in the art.

The preparation of the resins used in the present invention involves the reaction of an epoxy-novolac resin with a bisphenol resin. As stated above, the epoxy-novolac resin is commercially available, or could be prepared by the user by methods known in the art. Bisphenols are also widely commercially available. In a preferred method, the Mannich derivative of the bisphenol described above as formula 4 is prepared and reacted with the epoxy-novolac resin. Alternatively, the bisphenol is reacted with the epoxy-novolac and then the entire resin subjected to the Mannich reaction.

The terms "Mannich derivative" and "Mannich-derivatized" generally refer to the product which results by reacting a phenolic compound, such as a phenol, bisphenol or cresol, with an aldehyde and an amine. Reactions between a phenolic compound, an aldehyde and an amine are referred to as Mannich Reactions, and the methods for performing such reactions are well known to those skilled in the art.

Formaldehyde is typically the preferred aldehyde for use in the Mannich reaction, although any suitable aldehyde can be used.

Similarly, any suitable amine known to those skilled in the art for effecting the Mannich derivatization of a resin can be used, including but not limited to primary amines, secondary amines, alkanol amines, dialkanol amines, and mixtures thereof. Examples of suitable primary amines are methyl amine, ethyl. amine and butyl amine. Suitable secondary alkyl amines which may be used are those of the general formula (5):

(5)

in which R' and $R^2$ are the same or different and are selected from the group consisting of H, $C_qH_{2q+1}$, $C_qH_{2q}$—OH, where q is between about 1 and 18. Methyl ethyl amine (MEA) and diethanol amine (DEA) are preferred secondary alkyl amines, with DEA being most preferred.

As will be appreciated by those skilled in the art, epoxy-novolac resins are generally insoluble in water. Mannich derivatization of the resin, such as through addition of a substituent that has undergone Mannich derivatization, serves to improve its solubility in aqueous systems.

The number of "R" substituent groups that become attached to bisphenol during the Mannich Reaction, expressed as the degree of derivatization, can vary. That is, the number of "R" groups attached to each bisphenol molecule can vary from molecule to molecule. At least one bisphenol molecule or repeat unit will have a value of m+m' between 1.0 and 4.0; this molecule would therefore have between 1.0 and 4.0 "R" groups. While formula 1 shows 2 "R" groups attached to the bisphenol, it will be understood that each ring of the bisphenol can have two "R" groups, one "R" group, or no "R" groups, so long as m +m' are between 1.0 and 4.0 The degree of derivatization, or m+m', of a composition comprising a plurality of repeat units—that is, the average number of substituents on all of the bisphenol molecules in the entire composition—should be in the range of 0.5 to 4.0, preferably 2.0 to 3.5. It will be understood that the value for m+m' when a plurality of repeat units are present, represents the average number of substituents on a bisphenols of all of the repeat units. Thus, for some of the repeat units m+m' may equal zero, for other units m+m' may equal four, and the others may have a value somewhere in between. That is—some repeat units may have no R group, some may have four R groups, and others may have some number of R groups in between. The water dispersibility and/or solubility of the Mannich-derivatized resin will generally increase as the degree of derivatization increases. Accordingly, as with the molecular weight, the degree of derivatization of repeat units need only be high enough to achieve the desired level of dispersibility or solubility.

As described above, the R groups which attach to the bisphenol resin via the Mannich reaction are generally described by the formula (6):

(6)

$R^1$ through $R^4$ can be either the same or different and will vary depending on the amine and aldehyde used in the Mannich reaction. Typically, R' through $R^4$ will be independently selected from the group consisting of hydrogen, $C_qH_{2q+1}$ and $C_qH_{2q}$—OH, wherein q is between about 1 and 18. For example, when the amine used in the Mannich reaction is DEA, both $R^1$ and $R^2$ will equal $C_qH_{2q}$—OH, where q equals 2. $R^1$ through $R^4$ can also be selected from aryls, amino-alkyls, mercapto-alkyls and phospho-alkyls. Preferably, $R^3$ and $R^4$ are both hydrogen and R' and $R^2$ are both $C_2H_4OH$.

It is also within the scope of the invention for R to be of the general formula (7):

(7)

where $R^1$ through $R^4$ are as described above, and $R^5$ can be H, $C_qH_{2q+1}$, $C_qH_{2q}$—OH or $C_qH_{2q}$—COOH, but is preferably H.

It is also possible for a repeat unit to have one or more R groups that are represented by formula 6 and one or more R groups that are represented by formula 7. That is—each R group can be the same or different, and if different represents a mixture of formulas 6 and 7. Such a mixture is possible as during quaternization or protonation of the polymer, some of the R groups may become quaternized or protonized while others do not. Similarly, all of the R groups can remain uncharged (formula 6) or can all become charged (formula 7). In a composition comprising a plurality of repeat units, R will most likely be a mixture of formula 6 and formula 7 when a quaternizing or protonizing agent is also added to the composition. When no such agents are used, R will be generally represented by formula 6.

The polymer is preferably prepared in a suitable solvent. As used herein, the term "suitable solvent" refers to any organic or inorganic solvent which is capable of dissolving the polymer derivative. Examples would include, but not be limited to, alcohols, ketones, glycol ether based solvents and mixtures of these solvents. Particularly preferred are ethanol, propylene glycol n-propyl ether and dipropylene glycol methyl ether.

In a representative example of the preferred embodiment, presented in FIG. 1, BPA is reacted with formaldehyde and DEA to form Mannich derivatized bisphenol A (MBPA). MBPA is then further reacted with an epoxy-novolac resin. In an alternative embodiment of the present invention, presented in FIG. 2, epoxy-novolac resin is reacted with BPA first, and the epoxy-novolac/BPA resin is then Mannich-derivatized. The resulting polymer has at least one repeat unit generally represented by formula 1. In the embodiment shown in FIG. 1, the BPA, or other bisphenols, can have as many as four R groups attached thereto.

The Mannich-derivatized resins used in the methods of the present invention will preferably have a molar ratio of bisphenol (BP):aldehyde:amine ranging between about 1:0.5:0.5 to 1:4:4. A ratio giving good results in the present method is 1:2–3.5:2–3.5. The amount of epoxy-novolac resin used in comparison to the other components is best described as the moles of epoxide equivalent weight. The molar ratio of epoxide equivalent weight to bisphenol is affected by the solubility of the final product; generally the higher the amount of Mannich derivatives of bisphenol (MBP), the more soluble the product. To avoid cross-linking of the molecule, a molar ratio of epoxy to bisphenol of about 1:1 is preferred, with the lower ratio of bisphenol yielding lower solubility. Typically, this ratio is not lower than about 1:0.5.

Although the resins used in the methods of this invention are soluble in organic solvents and can be used when dissolved in an organic solvent such as, for example, ethanol, as a practical matter it will be desired to apply the treatment compound from a solution that is primarily water, with low levels of organic solvent. To provide the desired water solubility or water dispersibility of the product, an organic or inorganic acid can be used for protonization or quaternization of the amine moiety thereof. Useful acids for this purpose include but are not limited to acetic, citric, oxalic, ascorbic, phenylphosphonic, chloromethylphosphonic, mono, di and trichloroacetic, trifluoroacetic, nitric, phosphoric, hydrofluoric, sulfuric, boric, hydrochloric, hexafluorosilicic, hexafluorotitanic, hexafluorozirconic or tetrafluoroboric acids, alone or in combination with each other. Phosphoric acid is preferred; acetic acid is more preferred for the methods of the present invention because of its high rate of evaporation from the surfaces being treated thus leaving behind the polymer.

Quaternizing agents include, but are not limited to, methyl chloride, dimethyl sulfate and chloroacetic acid. The addition of water to the protonized or quaternized treatment compounds mentioned above results in a water soluble or water dispersible solution of the polymer derivative useful for metal or polymeric substrate treatment according to the present invention. Use of one or more of the acids listed above will yield the corresponding acid salt of the starting resin. Use of the quaternizing agents will yield the corresponding species of the starting resin. Generally, only enough of the protonizing or quaternizing compound is added to solubilize the resin.

The pH of the product at typical use levels can vary from between about 3 to 9. The preferred pH range in terms of both the results achieved and stability of the product is 4 to 7. "Use level" refers to the levels at which the composition of the present invention is used, and typically reflects the use of the compounds of the present invention in a solvent, diluted with water.

It is contemplated that the treatment compositions of the present invention will be used in a working solution at a dilute concentration. Under some circumstances, however, for example transporting or storing the solution, a concentrate of the solution may be preferred. A solution comprising up to 65% of the treatment composition may be provided. From a commercial point of view, a suitable concentrate of this invention comprises from about 5% to about 65% of the treatment compound.

The present invention is further directed to a method for treating a metal substrate comprising contacting said substrate with an effective amount of a composition comprising: a) a polymer, or an acid salt thereof, having at least one repeat unit of the formula (1):

wherein each R is independently selected from wherein $R^1$ through $R^4$ are independently selected from H, $C_qH_{2q+1}$ and $C_qH_{2q}$—OH; $R^5$ is selected from H, $C_qH_{2q+1}$, $C_qH_{2q}$—OH or $C_qH_{2q}$—COOH; q is between about 1 and 18; m and m' are each independently 0, 1, or 2 and m and m' together are between about 1.0 and 4.0; X is selected from H and $CH_3$; and Z is selected from straight chain or branched chain divalent aliphatic radicals having between about 1 and 3 carbon atoms, optionally and less preferred Z is also selected from $SO_2$, SO or O; and b) a suitable solvent.

The present invention is further directed to a similar method for treating a polymeric substrate with the composition described above.

It will be understood by those skilled in the art that the composition can be applied alone or can be applied in conjunction with all of the other compositions applied to the substrate being treated. For example, the present compositions can be combined with and applied at the same time as the phosphatizer. The term phosphatizer will be understood by those skilled in the art as referring to a product which reacts with a metal surface and converts the surface to an inorganic phosphate.

The present invention is concerned with the application of a treatment solution to a substrate, thereby improving the corrosion resistance and/or paint adhesion characteristics of the substrate. The present invention is particularly concerned with the post-treatment of a metal substrate. As used herein, the term "post-treatment" refers to the treatment of a metal substrate which is not bare metal, for example a metal substrate which has undergone conversion coating. Treatment of metal substrates having a bare metal surface is also within the scope of the present invention. The term "metal substrate", therefore, is used herein to refer to any metal surface, regardless of whether it has undergone conversion coating. Typical metal substrates include, but are not limited to, zinc and its alloys, aluminum and its alloys, iron, steel, galvanized steel and cold-rolled, ground, pickled, hot-rolled steel and polished steel.

Although the inventors believe that the methods of the present invention can be effectively employed on any metal substrate, the best results typically will be obtained if the metal substrate has been conversion coated. Processes and solutions for forming conversion coatings on metal surfaces are well known. Processes for applying a phosphate coating are described, for example, in *Metals Handbook*, Volume II, 8th Edition, pages 531–547 of the American Society for Metals. Different types of conversion coatings are available, depending on such factors as the quality level required, the type of paint or coating to be applied, the application method and the substrate being processed. Examples of conversion coating solutions include, for example, solutions comprising iron phosphate, magnesium phosphate, manganese phosphate, zinc phosphate, zinc phosphate modified with calcium, nickel or magnesium ions, mixed oxide and titanium or zirconium organometallic coatings. It is well within the ordinary skill of one practicing in the art to determine the best or most appropriate conversion coating for use in a given application.

Aside from the treatment of metal substrates, the methods of the present invention can also be employed to treat substrates such as polymeric materials, including but not limited to rubbers and plastics, for example, thermoplastics and thermosets. Treatment of such substrates according to the methods of the present invention is believed to increase the adhesion of paint or other decorative coatings to the substrate, to prevent surface migration of mold-release agents and may improve conductivity for electrostatic painting. The term "substrate" as used herein generally includes both polymeric substrates and metal substrates, as that term is defined above.

As used herein, the terms "contact" and "contacting" refers to applying the composition used in the methods of the present invention by any conventional method known in the art. For example, the composition can be applied to a surface or substrate by spray coating, roller coating, dipping or immersion. Spray coating is typically preferred in the metalworking industry. The temperature of the composition when applied to the substrate can vary over a wide range, but is preferably from 70° F. to 160° F.

As will be understood by one skilled in the art, an effective amount of the composition should be applied to the substrate being treated. As used herein, the term "effective amount", when used in conjunction with a composition, refers to that amount of the present composition needed to impart the desired level of corrosion resistance and/or paint adherence properties to the substrate being treated, or to adequately coat the substrate being treated. For example, contacting each square foot of the substrate to be treated with a composition comprising at least 0.01% active ingredient would typically represent the minimum effective amount for most uses. Preferred effective amounts typically range from 0.01 to 5% active ingredient.

After application of the treatment solution to the substrate, the substrate can optionally be rinsed. Although good results can be obtained without rinsing, it is believed that better results are achieved by rinsing off the residual solution. Surface analysis of rinsed metal panels reveals that the present composition is adsorbed onto the surface of the substrate. Typically, the end use will determine whether a rinse is applied at this stage. In some applications, it may be preferred that this rinse stage be omitted. Typical treatment processes include the following steps: clean, rinse, phosphatize, rinse, seal, rinse. The omission of the rinse stage of the treatment solution of the present invention allows for use of a five-stage recirculating washer rather than a six-stage washer. Similarly, the rinse stage between the phosphatizing and sealing steps can be omitted. Commercial needs and the needs of the user will therefore play a role in the decision to use various rinse steps. If rinsing is done, a typical effective contact time for the composition and substrate before the rinsing step ranges from about 5 seconds to 5 minutes, depending on the substrate being treated and the level of protection desired. The term "effective amount", when used in conjunction with contact time, therefore, refers to the length of time which the composition of the present invention should remain in contact with the substrate being treated to impart the desired level of protection.

Next, the treated substrate is dried. Drying can be carried out by, for example, circulating air or oven drying. It is also believed that oven drying yields better results than air drying, although the inventors do not wish to be bound by this. Oven drying can be effected at a temperature of between about 200 and 400° F. for a period of between about 1 and 15 minutes. Again, the needs of the user can determine which drying technique to employ.

After drying, the substrate is then ready for treatment such as painting, application of adhesive or the like. The substrate is suitable for standard paint or other coating application techniques such as brush painting, spray painting, electrostatic coating, dip, roller coating, as well as electrocoating. As a result of the methods of the present invention, the substrate, for example the metal surface, which is treated has improved corrosion resistance and paint adhesion properties.

As an example of an embodiment representative of the best mode, an epoxy-novolac resin is reacted with a Mannich derivatized bisphenol A resin (MBPA). The MBPA was formed by the Mannich Reaction, using formaldehyde, diethanolamine and BPA. The Mannich-derivatized product is then treated with acetic acid. The composition is then applied to a phosphatized steel surface, rinsed after a contact time of about 2 minutes and dried in an oven at about 300° F. for about 2–3 minutes prior to painting.

EXAMPLES

The following examples are intended to illustrate the invention and should not be construed as limiting the invention in any way.

Examples 1–3

Example 1

To a three-neck flask, 17.4 g of epoxy resin, obtained from Shell Chemical as EPON® 160 (0.1 mole of epoxide equivalent), and 40.23 g of dipropylene glycol methyl ether, obtained from Arco Chemicals as Arcosolv® DPM, were added. The mixture was stirred at ambient temperature until a homogeneous solution was obtained, to which 22.83 g of Bisphenol A (99 +%, 0.1 mol) was then charged. The mixture was allowed to react at about 90° C. for about 2 hours and cooled to about 55° C., before a premixed solution of 21.0 g of diethanolamine (99%, 0.2 moles) and 16.22 g formalin (37% aqueous formaldehyde solution, 0.2 moles) were added over a one-hour period under nitrogen. The reaction mixture was then held at about 55° C. for about 2 hours before it was heated to about 90° C. and maintained at about 90° C. for about 2–4 hours. After cooling, the resultant product can be made into an aqueous solution by adding an appropriate amount of phosphoric or acetic acid and deionized water and stirring until uniform. In this Example 1, m equalled zero and the average value of m' for the composition equalled about 2.

Examples 2–3

Following the above procedures, polymers of different compositions were made with various epoxy resins, to yield the products of Examples 2–3, as well as different neutralizing acids, quaternizing agents and amines.

Example 4–6

These Examples are illustrated in FIG. 2. This is an alternative route in which m is likely to be zero. Bisphenol A was reacted with formaldehyde and amine under appropriate conditions to yield the corresponding Mannich derivative before it was further reacted with epoxy resins to yield products of Examples 4–6.

To a 2 liter resin kettle, 441.9 g of Bisphenol A (97%, 1.88 mol), 469.7g of DPM, 398.8 g of diethanolamine (99%, 3.76 moles) and 304.8 g of formalin (37% aqueous fomaldehyde solution, 3.76 moles) were added. The mixture was heated and held at 55° C. for 3 hours before it was heated and held at 90° C. for 2.5 hours. This yields MBPA.

MBPA (860.15 g) was reacted with EPON® 160 (174.0 g) at 60° C. for 2.5 hours and subsequently ate 90° C. for 5 hours. The reaction mixture was cooled to room temperature. The resultant product (326.48 g) was dissolved in phosphoric acid (80% 77.35 g) and water (596.17 g) to yield an aqueous solution.

Also following the above procedures, polymers of different compositions can be made with various ratios of phenol/formaldehyde/amine (P/F/A), and epoxy resin/MBPA to yield product of Example 6. For all of the examples, the molar ratio of epoxide equivalent to BPA was 1:1. The pH of the examples was varied to determine the effect of pH in the present methods.

TABLE 1

Product Formulations

| Example | P/F/A ratio | Epon ® | Amine | pH@0.25% |
|---------|-------------|--------|-------|----------|
| 1 | 1/2.0/2.0 | 160 | DEA | 4.29 |
| 2 | 1/2.0/2.0 | 155 | DEA | 4.82 |
| 3 | 1/2.0/2.0 | 155 | MEA | 5.27 |
| 4 | 1/2.0/2.0 | 160 | DEA | 3.89 |
| 5 | 1/2.0/2.0 | 160 | DEA | 4.63 |
| 6 | 1/3.0/3.0 | 160 | DEA | 3.15 |

Following the method of Example 1, therefore, various products within the scope of the present invention can be prepared by altering the particular components and the ratios of these components.

Example 7

The above formulations, at use concentrations indicated in Table 4, were applied to iron phosphated metal at between ambient and 160° F. for various times by either spray or immersion. In a typical metal treatment operation, cold-rolled steel panels were cleaned with an alkaline cleaner, rinsed, treated with an iron phosphatizer (AC-8225, available from Calgon Corporation, Pittsburgh, Pa.), rinsed, treated with one of the above formulations, rinsed, and dried. Prepared phosphated panels, Bonderite® 1000 panels, purchased from ACT Laboratories (Hillsdale, Mich.) can also be used. Typically the sealing rinse solution was either sprayed for about 10–30 seconds or immersed for 2 minutes. The application method is noted in Table 2. Fast drying was accomplished by placing the panels in a 250–300° F. oven for 1–2 minutes.

The treated panels were painted with Duracron 200 (PPG Industries, Pittsburgh, Pa.) paint without any primer. Paint thickness was typically about 1 mil. Paint adhesion was determined in accordance with ASTM D3359 "Standard Test Methods for Measuring Adhesion by Tape Test", using test method B. The panels were scribed in the center down to the bare metal, and subsequently subjected to neutral salt spray testing by being placed in a salt spray cabinet containing a 5% aerated sodium chloride solution at 95° F. The salt solution was continually misted into the chamber. The panels were removed from the chamber at about 250 hours, and an air blow was employed to remove loose paint. ASTM rankings, mm readings reflecting the distance from the center of the scribe were determined in accordance with ASTM #B-117 "Standard Test Method for Evaluation of Painted or Coated Specimens Subjected to Corrosive Environments". Results are given in the following table.

TABLE 2

A.S.T.M. Rating of 250 Hour Salt Spray Test

| Example | A.S.T.M. Rating | Application Method |
|---|---|---|
| 1 | 6 | immersion |
| 2 | 6 | immersion |
| 3 | 5 | immersion |
| 4 | 6 | immersion |
| 5 | 5 | immersion |
| 6 | 5 | spray |
| control | 4 | |

TABLE 3

ASTM Ratings
Blister Creepage Ratings Scale (inches)

| Rating | mm |
|---|---|
| 10 | 0 |
| 9 | Over 0 to 0.5 |
| 8 | Over 0.5 to 1.0 |
| 7 | Over 1.0 to 2.0 |
| 6 | Over 2.0 to 3.0 |
| 5 | Over 3.0 to 5.0 |
| 4 | Over 5.0 to 7.0 |
| 3 | Over 7.0 to 10.0 |
| 2 | Over 10.0 to 13.0 |
| 1 | Over 13.0 to 16.0 |
| 0 | Over 16.0 to more |

The results of the above examples show that the application of the sealing rinse in accordance with the present invention provides good salt spray resistance to the material being treated. In all examples, the results were better than those obtained with the control panel, which contained no sealing rinse but was otherwise treated as the panels used to test formulations 1–6.

Example 8

The methods of Example 7 were repeated using the formulation of Examples 1, 2 and 3 but varying the type of acid used, the % active ingredient of the formulation, the pH of the solution applied and the type of drying (either in a 300° F. oven for 1–2 minutes or room temperature (R.T.) drying). The results are shown in Table 4.

TABLE 4

Application Conditions and A.S.T.M. Rating of 250 Hour Salt Spray

| Example | acid | active % | pH of sol'n | drying temp | A.S.T.M. Rating |
|---|---|---|---|---|---|
| 1 | phosphoric | 0.05 | 4.41 | 300 | 6 |
|   |   |      |      | RT  | 6 |
|   |   | 0.25 | 4.29 | 300 | 6 |
|   |   |      |      | RT  | 5 |
|   |   | 0.50 | 4.27 | 300 | 6 |
|   |   |      |      | RT  | 6 |
|   | acetic | 0.05 | 6.82 | 300 | 6 |
|   |   |      |      | RT  | 5 |
|   |   | 0.25 | 6.74 | 300 | 6 |
|   |   |      |      | RT  | 5 |
|   |   | 0.50 | 6.76 | 300 | 6 |
|   |   |      |      | RT  | 5 |
| 2 | phosphoric | 0.05 | 4.83 | 300 | 5 |
|   |   |      |      | RT  | 5 |
|   |   | 0.25 | 4.82 | 300 | 6 |
|   |   |      |      | RT  | 5 |
|   |   | 0.50 | 4.80 | 300 | 6 |
|   |   |      |      | RT  | 5 |
|   | acetic | 0.05 | 6.97 | 300 | 5 |
|   |   |      |      | RT  | 5 |
|   |   | 0.25 | 6.97 | 300 | 5 |
|   |   |      |      | RT  | 4 |
|   |   | 0.50 | 6.96 | 300 | 5 |
|   |   |      |      | RT  | 5 |
| 3 | phosphoric | 0.05 | 5.34 | 300 | 5 |
|   |   |      |      | RT  | 5 |
|   |   | 0.25 | 5.27 | 300 | 5 |
|   |   |      |      | RT  | 5 |
|   |   | 0.50 | 5.22 | 300 | 5 |
|   |   |      |      | RT  | 5 |
|   | acetic | 0.05 | 6.81 | 300 | 5 |
|   |   |      |      | RT  | 5 |
|   |   | 0.25 | 6.85 | 300 | 6 |
|   |   |      |      | RT  | 5 |
|   |   | 0.50 | 6.90 | 300 | 5 |
|   |   |      |      | RT  | 5 |
| control | no sealing rinse | | | | 4 |

This example shows that application conditions of the polymer of the present invention can be varied within the scope of the present invention. A range of concentrations, drying temperatures and different neutralization acids can be employed with successful results. Also, the oven dried panels gave improved results on several panels, but the panels that had been dried at room temperature gave comparable results and on only one occasion gave a result comparable to that obtained with the control.

Whereas particular embodiments of this invention have been described above for purposes of illustration, it will be evident to those skilled in the art that numerous variations of the details of the present invention may be made without departing from the invention as defined in the appended claims.

What is claimed is:

1. A method for treating a substrate, wherein said substrate is a polymeric material; comprising contacting said substrate, for an effective amount of time, with an effective amount of a composition comprising: a polymer or an acid salt thereof, having at least one repeat unit of the formula (1):

(1)

wherein each R is independently selected from wherein $R^1$ through $R^4$ are independently selected from H, $C_qH_{2q+1}$ and $C_qH_{2q}$—OH; $R^5$ is selected from H, $C_qH_{2q+1}$, $C_qH_{2q}$—OH, and $C_qH_{2q}$—COOH : q is between about 1 and 18; m and m' together equal between 1.0–4.0; X is selected from H and $CH_3$; and Z is selected from straight chain or branched chain divalent aliphatic radicals having between about 1 and 3 carbon atoms.

2. A method for treating a substrate, wherein said substrate is a polymeric material; comprising contacting said substrate, for an effective amount of time, with an effective amount of a composition comprising: a polymer or an acid salt thereof, having at least one repeat unit of the formula (1):

(1)

wherein each R is independently selected from wherein $R^1$ through $R^4$ are independently selected from H, $C_qH_{2q+1}$ and $C_qH_{2q}$—OH; $R^5$ is selected from H, $C_qH_{2q+1}$, $C_qH_{2q}$—OH, and $C_qH_{2q}$—COOH; q is between about 1 and 18; m and m' together equal between 1.0–4.0;X is selected from H and $CH_3$; and Z is selected from straight chain or branched chain divalent aliphatic radicals having between about 1 and 3 carbon atoms; wherein said polymeric material is selected from the group consisting of rubber and plastics.

3. A method for treating a substrate comprising contacting said substrate, for an effective amount of time, with an effective amount of a composition comprising: a polymer or an acid salt thereof, having at least one repeat unit of the formula (1):

(1)

wherein each R is independently selected from wherein $R^1$ through $R^4$ are independently selected from H, $C_qH_{2q+1}$ and $C_qH_{2q}$—OH; $R^5$ is selected from H, $C_{2q+1}$, $C_qH_{2q}$—OH, and $C_qH_{2q}$—COOH; q is between about 1 and 18; m and m' together equal between 1.0–4.0; X is selected from H and $CH_3$: and Z is selected from straight chain or branched chain divalent aliphatic radicals having between about 1 and 3 carbon atoms; wherein said composition further comprises a plurality of repeat units; wherein said composition is contained in a solvent; wherein at least one R is Z is 2,2-propylidene, and the solvent is dipropylene glycol methyl ether.

4. A method for treating a substrate comprising contacting said substrate with:

a) a phosphatizer;

b) a polymer or acid salt thereof, having at least one repeat unit of the formula(1):

(1)

wherein each R is independently selected from wherein $R^1$ through $R^4$ are independently selected from H, $C_qH_{2q+1}$ and $C_qH_{2q}$—OH; $R^5$ is selected from H, $C_qH_{2q+1}$, $C_qH_{2q}$—OH, and $C_qH_{2q}$—COOH; is between about 1 and 18; m and m' together are between about 1.0–4.0; X is selected from H and $CH_3$; and Z is selected from straight chain or branched chain divalent aliphatic radicals having between about 1 and 3 carbon atoms, $SO_2$, SO and O; and c) paint:

wherein said phosphatizer of step a) and said polymer of step b) are applied at the same time.

* * * * *